United States Patent
MacKay et al.

(10) Patent No.: US 12,132,515 B2
(45) Date of Patent: Oct. 29, 2024

(54) LOCALIZED SPAN LAUNCH POWER CONTROL FOR NETWORK LEVEL OPTIMIZATION

(71) Applicant: Ciena Corporation, Hanover, MD (US)

(72) Inventors: Alex W. MacKay, Ottawa (CA); Andrew D. Shiner, Ottawa (CA); Yinqing Pei, Kanata (CA); David W. Boertjes, Nepean (CA); Fangyuan Zhang, Kanata (CA)

(73) Assignee: Ciena Corporation, Hanover, MD (US)

( * ) Notice: Subject to any disclaimer, the term of this patent is extended or adjusted under 35 U.S.C. 154(b) by 331 days.

(21) Appl. No.: 17/868,209

(22) Filed: Jul. 19, 2022

(65) Prior Publication Data
US 2024/0031023 A1    Jan. 25, 2024

(51) Int. Cl.
*H04B 10/079* (2013.01)
*H04Q 11/00* (2006.01)

(52) U.S. Cl.
CPC . *H04B 10/07955* (2013.01); *H04B 10/07953* (2013.01); *H04Q 11/0066* (2013.01); *H04Q 2011/0083* (2013.01)

(58) Field of Classification Search
CPC ........ H04B 10/07955; H04B 10/07953; H04Q 11/0066; H04Q 2011/0083
USPC .......................................................... 398/27
See application file for complete search history.

(56) References Cited

U.S. PATENT DOCUMENTS

| | | | |
|---|---|---|---|
| 6,606,176 B1 * | 8/2003 | Essiambre | H04B 10/508 398/189 |
| 6,618,193 B1 | 9/2003 | Boertjes et al. | |
| 8,112,001 B2 * | 2/2012 | Lowery | H04B 10/6163 398/208 |
| 8,364,036 B2 | 1/2013 | Boertjes et al. | |
| 8,509,618 B2 | 8/2013 | Boertjes et al. | |
| 8,509,621 B2 | 8/2013 | Boertjes et al. | |
| 8,554,074 B2 | 10/2013 | Boertjes et al. | |
| 8,750,706 B2 | 6/2014 | Boertjes et al. | |
| 8,958,696 B2 | 2/2015 | Boertjes et al. | |
| 9,077,474 B2 | 7/2015 | Boertjes et al. | |
| 9,143,238 B2 | 9/2015 | Roberts et al. | |
| 9,258,190 B2 | 2/2016 | Swinkels et al. | |
| 9,276,696 B2 | 3/2016 | Al Sayeed et al. | |
| 9,344,193 B2 | 5/2016 | Boertjes et al. | |
| 9,419,708 B2 | 8/2016 | Rad et al. | |
| 9,509,434 B2 | 11/2016 | Swinkels et al. | |
| 9,577,763 B2 | 2/2017 | Al Sayeed et al. | |

(Continued)

FOREIGN PATENT DOCUMENTS

| | | |
|---|---|---|
| EP | 1378082 A2 | 1/2004 |
| EP | 3107255 B1 | 5/2018 |

(Continued)

*Primary Examiner* — Mohammad R Sedighian
(74) *Attorney, Agent, or Firm* — Baratta Law PLLC; Lawrence A. Baratta, Jr.

(57) ABSTRACT

Systems and methods of optimizing launch power for each span in an optical system with a plurality of spans are provided. In an embodiment, a method includes varying power on a span under test of the plurality of spans; observing performance measurements related to of one or more channels, at corresponding optical receivers; and one of setting launch power for the span under test and repeating the varying and observing, responsive to the observed measurements.

20 Claims, 9 Drawing Sheets

(a)

(56) References Cited

U.S. PATENT DOCUMENTS

| | | | |
|---|---|---|---|
| 9,806,803 B2 | 10/2017 | Bownass et al. |
| 9,831,947 B2 | 11/2017 | Boertjes |
| 9,831,977 B2 | 11/2017 | Boertjes et al. |
| 10,237,011 B2 | 3/2019 | Al Sayeed et al. |
| 10,277,311 B2 | 4/2019 | Archambault et al. |
| 10,361,957 B1 | 7/2019 | MacKay et al. |
| 10,404,365 B2 | 9/2019 | Frankel et al. |
| 10,536,235 B2 | 1/2020 | Al Sayeed et al. |
| 10,784,980 B2 | 9/2020 | Roberts et al. |
| 11,070,286 B1 | 7/2021 | Shiner et al. |
| 11,139,633 B2 | 10/2021 | Pei et al. |
| 11,196,504 B1 | 12/2021 | Frankel et al. |
| 11,209,315 B2 | 12/2021 | Pei et al. |
| 11,228,383 B2 | 1/2022 | Shiner et al. |
| 11,272,269 B1 | 3/2022 | Chedore et al. |
| 11,343,011 B2 | 5/2022 | Boertjes et al. |
| 2003/0042402 A1 | 3/2003 | Boertjes et al. |
| 2004/0151426 A1 | 8/2004 | Boertjes et al. |
| 2007/0212064 A1 | 9/2007 | Boertjes et al. |
| 2012/0237213 A1* | 9/2012 | Yin ................. H04B 10/071 398/28 |
| 2013/0156421 A1* | 6/2013 | Bravi ............... H04B 10/07951 398/29 |
| 2017/0359141 A1 | 12/2017 | Boertjes et al. |
| 2018/0205454 A1 | 7/2018 | Shiner et al. |
| 2018/0239522 A1 | 8/2018 | Campbell et al. |
| 2018/0241468 A1 | 8/2018 | Shiner et al. |
| 2018/0295429 A1 | 10/2018 | Swinkels et al. |
| 2018/0359029 A1 | 12/2018 | Shiner et al. |
| 2019/0215586 A1 | 7/2019 | Swinkels et al. |
| 2019/0326992 A1 | 10/2019 | Charlton et al. |
| 2019/0383699 A1 | 12/2019 | Shiner et al. |
| 2020/0076499 A1 | 3/2020 | Al Sayeed et al. |
| 2021/0226408 A1 | 7/2021 | Boertjes et al. |
| 2022/0007093 A1 | 1/2022 | MacKay et al. |
| 2022/0067666 A1 | 3/2022 | Shiner et al. |
| 2022/0070044 A1 | 3/2022 | Vaquero-Caballero et al. |
| 2022/0149938 A1 | 5/2022 | Pei et al. |
| 2022/0166683 A1 | 5/2022 | Shiner et al. |

FOREIGN PATENT DOCUMENTS

| | | | |
|---|---|---|---|
| EP | 3750282 A1 | 12/2020 |
| EP | 3847778 A1 | 7/2021 |
| EP | 3925112 A1 | 12/2021 |
| EP | 3970287 A1 | 3/2022 |
| WO | 2022006395 A1 | 1/2022 |

* cited by examiner

100

STEP 102 VARYING POWER ON A SPAN UNDER TEST OF THE PLURALITY OF SPANS

STEP 104 OBSERVING TOTAL NOISE, AT A COHERENT RECEIVER, FROM ALL OF THE PLURALITY OF SPANS

STEP 106 ISOLATING NOISE FOR THE SPAN UNDER TEST FROM THE TOTAL NOISE BASED ON THE VARYING POWER

STEP 302 VARYING POWER ON A SPAN UNDER TEST OF THE PLURALITY OF SPANS WHILE MAINTAINING INPUT POWER TO DOWNSTREAM SPAN(S)

STEP 304 OBSERVING MEASUREMENTS RELATED TO ONE OR MORE CHANNELS, AT CORRESPONDING OPTICAL RECEIVERS

STEP 306 ONE OF SETTING LAUNCH POWER FOR THE SPAN UNDER TEST AND REPEATING THE VARYING AND OBSERVING, RESPONSIVE TO THE OBSERVED MEASUREMENTS

FIG. 8

LOCALIZED SPAN LAUNCH POWER CONTROL FOR NETWORK LEVEL OPTIMIZATION

FIELD OF THE DISCLOSURE

The present disclosure generally relates to optical networking. More particularly, the present disclosure relates to systems and methods for in-service characterization of nonlinear interference (NLI) on a per-span basis on an optical link and for systems and methods for localized launch power control for network level optimization.

BACKGROUND OF THE DISCLOSURE

Quantifying impairments resulting from nonlinear interference (NLI) in fiber optic communication systems is crucial for maximizing system performance. The noise that develops in each amplified span primary consists of amplified spontaneous emission (ASE) and NLI. ASE depends on amplifier gain and can be predicted with high accuracy given our knowledge of the amplifier parameters and the optical power. NLI is more challenging to estimate because it depends on properties of the optical fiber which are often unknown or can be mis-provisioned. However, per-span NLI is important for performance optimization. Also, the inventors have presented an approach described in U.S. Pat. No. 11,139,633, issued Oct. 5, 2021, and entitled "In-situ fiber characterization using nonlinear skirt measurement," the contents of which are incorporated by reference in their entirety. This approach enables per-span fiber nonlinear parameter measurement and modeling. However, this approach must be implemented at commissioning and is not available once an optical link is in-service.

Also, in fiber optic communication systems (also referred to as optical networks, optical systems, etc.), there is an optimum launch power into each span which minimizes the noise contribution by that span to the total noise to signal ratio (NSR) at the receiver. The achievable error-free capacity is related to the NSR via the Shannon-Hartley theorem. Noise contributed from an amplified span includes contributions from ASE from the amplifier(s), ASE generated on the fiber due to Raman scattering, and nonlinear noise, primarily from propagation through the fiber. Existing power control approaches in optical systems are based on modeling with a combination of provisioned or measured parameters as inputs. For example, in an existing implementation, the per span optimal launch power is obtained from modeling based on measured optical power per span and factory calibrated noise figure for EDFA linear noise modeling, as well as based on provisioned fiber parameters for fiber nonlinear noise modeling. However, the approach utilizes open loop control based on modeling which suffers from errors from multiple sources. The multiple sources of error include the fact some of the input parameters are provisioned and my not reflect real system performance, the fact that measured input parameters may suffer from measurement errors, the fact the modeling is itself very sophisticated, which is very challenging to achieve sufficient accuracy under all operation conditions, and the like. Additionally, the modeling of the system performance and optimal launch power requires significant computing power.

BRIEF SUMMARY OF THE DISCLOSURE

The present disclosure relates to systems and methods for in-service characterization of nonlinear interference (NLI) on a per-span basis on an optical link. Specifically, the present disclosure includes a process that uses an optical receiver at the end of a multi-span link for measuring NLI on a per span basis. An enabler is to have a pair of variable optical attenuators (VOAs) before and optionally after the line fiber of each span, where the first VOA before the fiber is for changing power into the span under test, such that NLI generated by the span under test will be changed and will be detected at the optical receiver. When available, the second VOA after the fiber span is used to contain the power change within the fiber span under test such that the performance of all other components of the link (including fibers in span not under test, all amplifiers and transponders) are unchanged. In this way, the change of signal vs. noise detected by the optical receiver (i.e., $\Delta NSR_{tot}$) is only due to the change of NLI at span under test. By estimating the ASE and NLI, we can estimate the noise performance of a span. By concatenating the noise contributions for the spans along a route, we can determine the operating margin for a channel and the capacity that can be carried. Determining the per span NLI allows for control where we optimize the operating conditions for each span, validation of noise modeling, as well as confirmation that restoration paths are viable. As described herein, the VOAs are "dithered" for a particular span for determining the linear and nonlinear noise contributions for a particular span in a multi-span link. This data is important for predicting the performance of the link as well as for links that traverse any combination of characterized spans. While the VOAs provide one approach, any approach for modifying a per span power is contemplated, including amplifier gain modifications for each span.

In an embodiment, a method of measuring nonlinear interference (NLI) on a per-span basis in an optical system with a plurality of spans includes varying power on a span under test of the plurality of spans; observing total noise, at an optical receiver, from all of the plurality of spans; and isolating noise for the span under test from the total noise based on the varying power. The optical system can be in-service with one or more traffic-carrying channels, and wherein the varying power on the span under test has a negligible impact on the performance of the one or more traffic-carrying channels. The varying power can be performed based on modifying settings of variable optical attenuators (VOAs). The varying power can be performed based on modifying settings associated with any of a launch power and amplifier gain. The change of linear noise in the amplifier can be removed from the change of noise measured at the optical receiver based on linear noise modeling. The varying power and the observing total noise can be performed multiple times with the isolating noise including averaging based on the multiple times. The varying power and the observing total noise can include phase sensitive detection where a power perturbation is dithered and the observing total noise is estimated for each oscillation of the power perturbation.

The method can further include performing the isolating noise for all of the plurality of spans; and characterizing noise for existing channels on the optical system on a per-span basis. The method can further include performing the isolating noise for all of the plurality of spans; and determining launch power per span with channel loading. The method can further include performing the isolating noise for all of the plurality of spans; and characterizing fiber nonlinear parameters per span. The noise can be a noise-to-signal ratio (NSR). The method can further include utilizing the noise for all of the plurality of spans to determine any of whether restoration of a service will work and performance of a new service, each over the plurality of spans.

Also, the present disclosure relates to systems and methods for localized launch power control for network level optimization. Specifically, the present disclosure includes optimizing the span launch power of one or more spans in a fiber optic link by removing the coupling between spans that normally makes it difficult to build power control loops at the network level. This approach relates to the coupling between spans through the use of a downstream compensating action and then a control loop that optimizes the power in each span individually based on BER or a similar performance metric (e.g., SNR, NSR, error vector magnitude, etc.) feedback. The example feedback loop used first harmonic detection with a dither to improve sensitivity, but it would have also worked if we had varied the span launch power for a span under test in response to changing BER provided there was a compensating action to decouple the spans (such as the gain of the amplifier preceding the following span). In an embodiment, the present disclosure includes optimizing the launch power for each span in a multi-span network where the per span launch power settings collectively result in the minimum BER for channel(s) traversing the multi-span network. The span launch power can be dithered by changing the span input VOA (i.e., at amplifier output before the span), and a measurement of the BER that is synchronous (or asynchronous) with that dither is used as an error signal as part of a feedback mechanism to adjust the span launch power to a value that minimizes the BER. The power dither is applied in one span and compensated by a gain or loss actuator prior to the subsequent span, such as another VOA or the gain of the amplifier preceding the subsequent span. Also, multiple spans can be dithered simultaneously at different dither frequencies and the component of the BER variation which is detected at each dither frequency is used to adjust the gain in the respective span.

In an embodiment, a method of optimizing launch power for each span in an optical system with a plurality of spans includes varying power on a span under test of the plurality of spans; observing performance measurements related to of one or more channels, at corresponding optical receivers; and one of setting launch power for the span under test and repeating the varying and observing, responsive to the observed measurements. The varying power can be performed based on modifying settings of variable optical attenuators (VOAs). The varying power can be performed based on modifying settings associated with any of a launch power and amplifier gain. The varying can include dithering the power based on variable optical attenuator (VOA) settings or a combination of VOA settings and amplifier gain settings. The measurements can be used as an error signal in the repeating to obtain a substantially minimized error signal. The repeating can include an adjustment of the varying power based on whether the span under test is in a linear regime or nonlinear regime. The setting launch power can be determined when a sign of a change in the measurements between iterations has changed. The varying power and the observing the measurements can be performed multiple times including averaging based on the multiple times. The varying power can be performed in the span under test and compensated in a subsequent span. The method can further include performing the varying and the observing on different spans simultaneously by performing the varying with different dither frequencies on the different spans and detecting the measurements at each of the different dither frequencies.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a flowchart of a process for measuring nonlinear interference (NLI) on a per-span basis in an optical system with a plurality of spans.

FIG. 8 is a flowchart of a process for optimizing launch power for each span in an optical system with a plurality of spans.

DETAILED DESCRIPTION OF THE DISCLOSURE

Figure 1A:
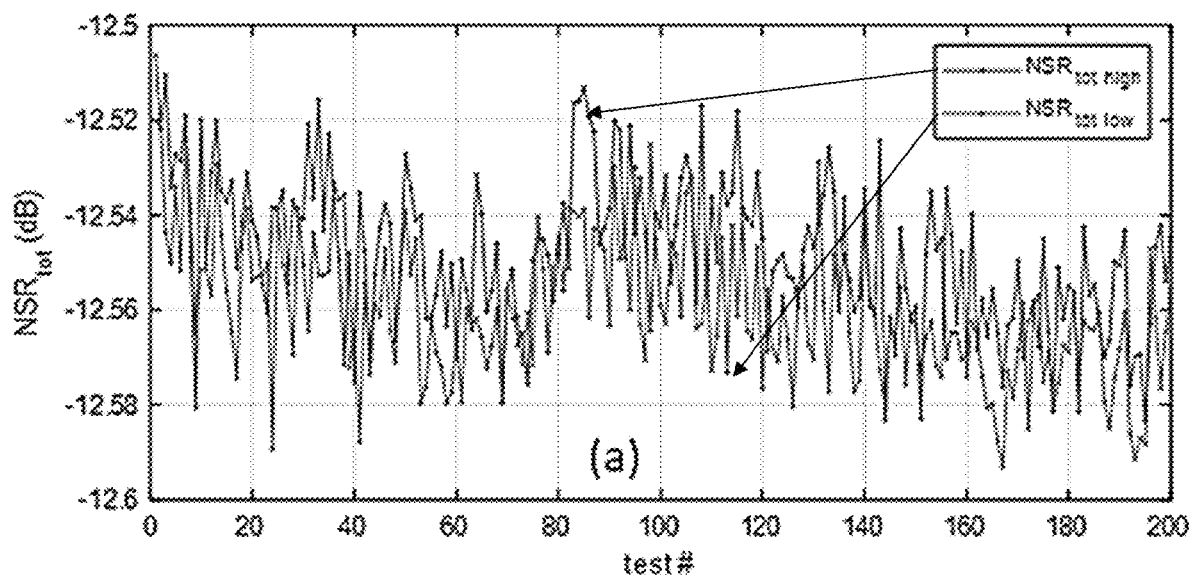
FIGS. 1A and 1B are graphs of experimental measurement results.

The present disclosure relates to systems and methods for in-service characterization of nonlinear interference (NLI) on a per-span basis on an optical link. Specifically, the present disclosure includes a process that uses an optical receiver at the end of a multi-span link for measuring NLI on a per span basis. An enabler is to have a pair of variable optical attenuators (VOAs) before and optionally after the line fiber of each span, where the first VOA before the fiber is for changing power into the span under test, such that NLI generated by span under test will be changed and will be detected at the optical receiver. The second VOA after the fiber span is used to contain the power change within the fiber span under test such that the performance of all other components of the link (including fibers in span not under test, all amplifiers and transponders) are unchanged. In this way, the change of signal vs. noise detected by the optical receiver (i.e., $\Delta NSR_{tot}$) is only due to the change of NLI at span under test.

An extension of the two VOA approach is to use the VOA located after the downstream amplifier to compensate for the perturbation introduced by the first VOA or to use the gain of the downstream amplifier to counteract the induced loss of the first VOA with gain. This approach isolates the measurement within the line fiber under test and the amplifier at the output side of the line fiber. It does not require an VOA at the output side of the line fiber. Amplifier noise modeling is used to estimate the amplifier response to the perturbation and to remove it from $\Delta NSR_{tot}$ enabling an estimate of the NLI.

The present disclosure also includes a process that uses phase sensitive detection with a small periotic power perturbation (shallow dithering) to enable accurate measurement of small changes in $NSR_{tot}$ using an optical receiver. With this process, per-span NLI performance can be accurately measured and backed out with small change of span launch power while the impact to the total transmission performance is negligible.

Advantageously, the present disclosure provides accurate measurement of per-span NLI without disrupting in service channels and with negligible impact to total transmission performance. Also, non-traffic carrying channels (e.g., an amplified spontaneous emission (ASE) channel holder, a probe channel, etc.) can be used for measuring the nonlinear fiber parameters of each span. The fiber nonlinear parameters can be used for modeling the transmission performance for any channel loading condition and can be used for viability check before adding new channels. It is important to characterize fiber nonlinear parameters for modeling, link budgeting, and performance optimization. The fiber nonlinear parameters characterization can include the propagation coefficient, $\beta$ (specifically the second derivative, or group velocity dispersion parameter, $\beta_2$), and the fiber nonlinear coefficient, $\gamma$. The group velocity dispersion (GVD) parameter, i.e., $\beta_2$, and fiber nonlinear coefficient, i.e., $\gamma$, are among the most critical fiber characteristics for photonic line system link budget, performance modeling, and optimization.

By estimating the ASE and NLI, we can estimate the noise performance of a span. By concatenating the noise contributions for the spans along a route, we can determine the operating margin for a channel and the capacity that can be carried. Determining the per span NLI allows for control where we optimize the operating conditions for each span, validation of noise modeling, as well as -7-onfirmation that restoration paths are viable.

Again, the present disclosure provides system configurations and procedures for extracting the NLI contribution from individual fiber spans from the noise observed at an optical transceiver or set of optical transceivers. These measurements can be performed on a live, traffic-carrying network.

Of note, the terms "optimization" and "optimal" are meant to signify some improved value and do not necessarily mean the absolute best. That is, these are substantially the best values or even better values than before, but not necessarily the absolute best.

§ 1 Measurement Process

The key to measure per-span NLI using an optical receiver is to isolate the span NLI from the total noise-to-signal ratio (NSR) observed by that receiver. An optical receiver can report the total NSR through a BER-to-NSR transduction. The total NSR at the receiver can be represented as a summation of incremental NSR penalties due to various sources between and including the transmitter and receiver. The noise contributions can be written in descending order as:

$$NSR_{tot}=NSR_{imp,tot}+NSR_{ASE,tot}+NSR_{NL,tot} \quad (1)$$

As highlighted by the first few terms shown, the largest contributing terms to the NSR are typically the:

$NSR_{imp,tot}$—modem implementation noise $NSR_{ASE,tot}$—amplified spontaneous emission (ASE) noise, which includes noise funneling at add sites, where $NSR_{ASE,tot}=\Sigma_k NSR_{ASE,k}$, k indexes the spans in the path of an optical transceiver, and $NSR_{NLI,tot}$—NLI, where $NSR_{NLI,tot}=\Sigma_k NSR_{NLI,k}$, k indexes the spans in the path of an optical transceiver.

Additional terms which have not been shown include polarization dependent loss (PDL), polarization mode dispersion (PMD), wavelength selective switch (WSS) filter effects, etc., which are not dominate factors of $NSR_{tot}$, and are not directly related to per-span input power.

Prior art has been able to isolate $NSR_{NLI,tot}$ from $NSR_{tot}$. However, NLI per span, written as $NSR_{NLI,k}$ for k=1~K, has never been resolved based on measurement at an optical receiver. Unfortunately, $NSR_{NLI,k}$ is more important than $NSR_{NLI,tot}$ in terms of optimizing system performance, which must be done on a per span basis.

This disclosure teaches extracting the NLI based on varying the power in individual spans and observing the change in noise at a receiver. The power launched into a span can be perturbed with a variable optical attenuator (VOA) and an optional second VOA after the span compensates for the change in power limiting the perturbation to the span under test. By dithering the VOA and employing phase sensitive detection, the NLI can be estimated with very small power perturbations which do not impact traffic carrying signals, in-service. We refer to this technique as 'shallow dithering'.

We begin by explaining how VOAs and the shallow dither technique may be used to extract the NLI in two different configurations. We then show experimental results demonstrating the use of phase sensitive detection with a small power perturbation to extract the NLI.

§ 1(a) Isolate Change Within Span Under Test Using VOA's Before and After Each Fiber Span In order to measure NLI per span, i.e., $NSR_{NLI,k}$ k=1~K, we need to isolate the nonlinearity generated by the span under test from $NSR_{imp,tot}$, $NSR_{ASE,tot}$ and $NSR_{NLI,m}$ (m≠k). The proposed approach can utilize two VOA's, one placed before and the other placed after the line fiber in each span. The VOA before the span under test, is used to change the input signal power into the fiber, thus $NSR_{NLI,k}$ will be changed. Concurrently, the second VOA after the span under test compensates for the change of loss introduced by the first VOA to keep the lost constant between the amplifying sites, all other elements in the link (amplifiers, spans that are not under test, etc.) will not experience a state change (power, gain, etc.) during the measurement of span k, hence $NSR_{imp,tot}$, $NSR_{ASE,tot}$ and $NSR_{NLI,m}$ (m≠k) remain unchanged. Consequently, when performing the NLI measurement of span k, the change of $NSR_{tot}$ measured at the optical receiver is only due to the change of NLI at span k, i.e., $$\Delta NSR_{tot} = NSR_{NL,k}|_{voa_{state1}} - NSR_{NL,k}|_{voa_{state2}} \quad (2)$$

Furthermore, the signal power of each channel at each span is known due to a combination of total power monitors, optical channel power monitors (OCM, also known as OPM), and other provisioning data allowing for accurate combined propagation models with backward error correction to determine power spectral information anywhere in the system. This model is described in PCT Patent Application No. PCT/US2021/40087, filed Jul. 1, 2021, and entitled "Utilizing an incremental noise metric for rapid modeling of optical networks," the contents of which are incorporated by reference in their entirety. Therefore, when measuring span k, signal power at the input of the fiber after the first VOA can be denoted by:

At VOA state1: signal power is $Ps_k$

At VOA state2: signal power is $\Delta\alpha_{voa} Ps_k$, where $\Delta\alpha_{voa}$ is the change in VOA transmission between VOA state1 and state2 in linear space.

Note again that when the VOA before span k changes by $\Delta\alpha_{voa}$ (in linear units), the VOA after span k will need to change by $1/\Delta\alpha_{voa}$ in order to keep total span loss constant. Since the power of nonlinear product changes cubically as the power of the signal, the NLI product generated at span k at the 2 VOA settings are denoted as:

With VOAs in state1: Power of Nonlinear product is $P_{NL,k}$,

With VOAs in state2: Power of nonlinear product is $\Delta\alpha_{voa}^3 P_{NL,k}$.

Therefore, Eq. (2) can be re-written as $$\Delta NSR_{tot} = \frac{P_{NL,k}}{P_{s,k}} - \frac{\Delta\alpha_{voa}^3 P_{NL,k}}{\Delta\alpha_{voa} P_{s,k}} = \frac{(1-\Delta\alpha_{voa}^2) P_{NL,k}}{P_{s,k}} \quad (3)$$

And since $P_{s,k}$ and $\Delta\alpha_{voa}$ are known, $P_{NL,k}$ can be computed as $$P_{NL,k} = \Delta NSR_{tot} * P_{s,k}/(1-\Delta\alpha_{voa}^2) \quad (4)$$

and $NSR_{NL,k}$ at initial VOA setting (VOA setting 1), can be computed as $$NSR_{NL,k} = \Delta NSR_{tot}/(1-\Delta\alpha_{voa}^2) \quad (5)$$

§ 1(b) Estimating NLI with One VOA Per Amplified Span

The preceding subsection showed how a pair of VOAs located on either end of a transmission fiber can be used to isolate the nonlinear noise contribution from that fiber span. However, in some optical systems, there is only one VOA at the output of erbium-doped fiber amplifier (EDFA) to adjust the input power into the transmission fiber. There is not a VOA at the output side of the transmission fiber. However, we can still employ a similar approach where the VOA at the input of the transmission fiber under test is used to perturb the power entering a transmission fiber and the VOA at the input of the next span provides the compensating action. In the previous example VOAs on both ends of the span were used to ensure that the power entering the downstream amplifier remained constant. In this case the power perturbation will have a small impact on the noise characteristics of the downstream amplifier which will need to be accounted for with an amplifier model as described below.

The noise to signal ratio of the amplifier can be calculated as follows:

$$NSR_{ASE,k} = \frac{P_{ASE}}{\frac{P_{s,k}}{Lo_s}} = \frac{Lo_s hf\left(10^{\frac{NF_{dB}}{10}} 10^{\frac{G_{dB}}{10}} - 1\right) B_w}{P_{s,k}} \quad (6)$$

where:
$Lo_S$ is the fiber span loss
h is Planck's constant
f is the channel center frequency
$NF_{dB}$ is the noise figure of EDFA at the end of span in dB unit
$G_{dB}$ is the gain of EDFA at the end of the span in dB unit
$B_w$ is the channel bandwidth $P_{s,k}$ was defined in section 1(a), which is the input power to the fiber Therefore, the change in linear NSR can be obtained as:

$$\Delta NSR_{ASE,k} = \frac{Lo_s hf\left(10^{\frac{NF_{dB}+G_{dB}}{10}} - 1\right)B_W}{P_{s,k}} - \frac{Lo_s hf\left(10^{\frac{NF_{dB}+G_{dB}}{10}} - 1\right)B_W}{\Delta\alpha_{voa} P_{s,k}} = \left(1 - \frac{1}{\Delta\alpha_{voa}}\right)\frac{Lo_s hf\left(10^{\frac{NF_{dB}+G_{dB}}{10}} - 1\right)B_W}{P_{s,k}} \quad (7)$$

Here, we also share the same parameters as section 1(a). According to Eq. (3), the change in nonlinear NSR is as followed:

$$\Delta NSR_{NL,k} = \frac{(1-\Delta\alpha_{voa}^2) P_{NL,k}}{P_{s,k}} \quad (8)$$

The total variation in the NSR can be obtained by:

$$\Delta NSR_{tot} = \Delta NSR_{ASE,k} + \Delta NSR_{NL,k} \quad (9)$$

As a result, nonlinear NSR at initial VOA setting can be computed as:

$$NSR_{NL,k} = \frac{\Delta NSR_{tot} - \Delta NSR_{ASE,k}}{(1-\Delta\alpha_{voa}^2)} \quad (10)$$

where $\Delta NSR_{ASE,k}$ can be calculated using Eq. (7). This technique allows per-span NLI estimates from networks in-service and where there is only one VOA.

§ 1(c) Shallow Dithering with Phase Sensitive Detection for Accurate Per-Span NLI Measurement While Minimizing the Impact to Rx Performance of Live Traffic The challenge of doing the above mentioned per span NLI measurement is to make sure the $\Delta NSR_{tot}$ introduced by changing the VOAs of the span under test is small enough that it does not impact live traffic. Ideally, $\Delta NSR_{tot}$ should be negligible from the receiver performance perspective and yet accurately quantifiable. Because the change in $NSR_{tot}$ resulting from the power perturbation is small compared with other noise sources in the transmission system it is difficult to accurately measure. Directly averaging the signal is ineffective because $\Delta NSR_{tot}$ is also small compared with noise variations resulting from drifts in the system over the required averaging time. In order to address this challenge, we use phase sensitive detection where the power perturbation is dithered, and we estimate $\Delta NSR_{tot\_test,i}$ for each oscillation of the perturbation. By averaging over the change in NSR that is synchronous with the perturbation we can quantify the tiny change in $\Delta NSR_{tot}$.

We demonstrated this idea in a 10-span optical link, where the input power to span 9 is dithered by ±1 dB, 200 times. An optical signal is transmitted over the 10-span optical link. The receiver measures $NSR_{tot\_Low}$ when the input power of span 9 is set to the lower value, and it measures $NSR_{tot\_High}$ when the input of span 9 is set to the higher value. $\Delta NSR_{tot}$ is calculated immediately after each toggling and record as $\Delta NSR_{tot\_test,i}$. After 200 cycles the averaged $\Delta NSR_{tot}$ is calculated by $$\Delta NSR_{tot} = \sum_{i=1}^{N} \Delta NSR_{tot\_test,i}/N \qquad (11)$$

where N=200. The obtained $\Delta NSR_{tot}$ can then be used for calculating $P_{NL,k}$ and $NSR_{NL,k}$ with Eq. (4) and Eq. (5) if the system has two VOA's at both ends of each transmission fiber as described in section 1(a), or, the obtained $\Delta NSR_{tot}$ can then be used for calculating $P_{NL,k}$ and $NSR_{NL,k}$ with Eqs. (7)-(10) if the system only has VOA's at the inputs side of the transmission fibers.

Figure 1B:
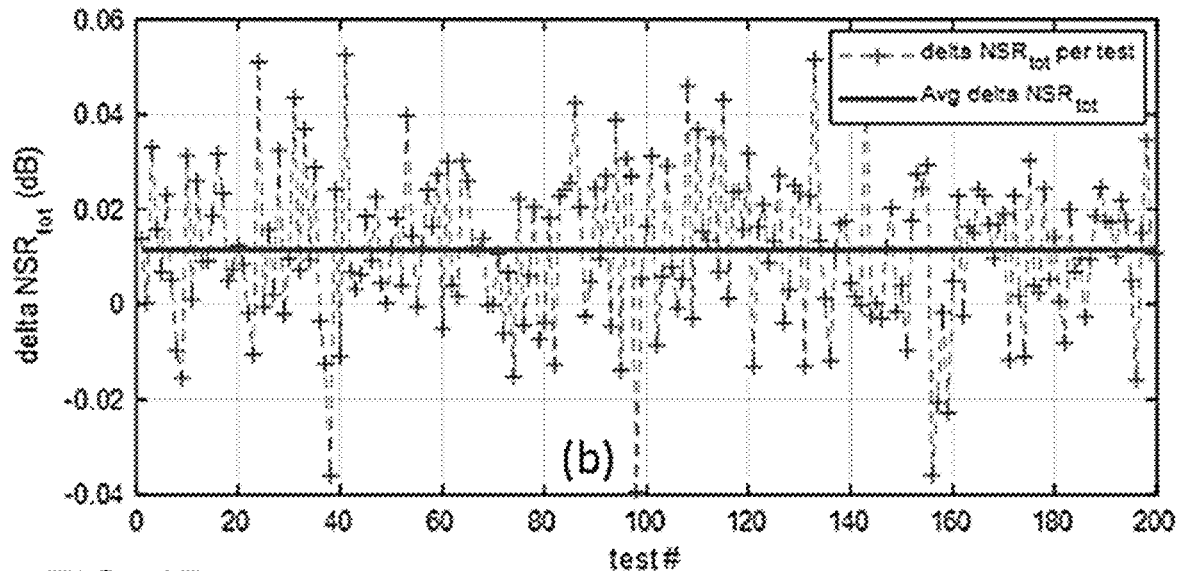

The measurement results are shown in FIGS. 1A and 1B. FIG. 1A shows that both $NSR_{tot\_Low}$ and $NSR_{tot\_High}$ are noisy and the fluctuations are larger than the change caused by the perturbation. There is also a downward trend over the 200 tests. FIG. 1B plots $\Delta NSR_{tot\_test,i}$ over the 200 tests. The offset shown in FIG. 1B is the average value of $\Delta NSR_{tot\_test,i}$ (i=1~200), which is only 0.0115 dB—it means that the ±1 dB dithering of the input power at span 9 of the 10-span system is negligible to the signal Rx performance. However, it enables accurate measurement of the small $\Delta NSR_{tot}$ in a live system for per span NLI measurement.

§ 2 System Configuration and Applications

Figure 2A:
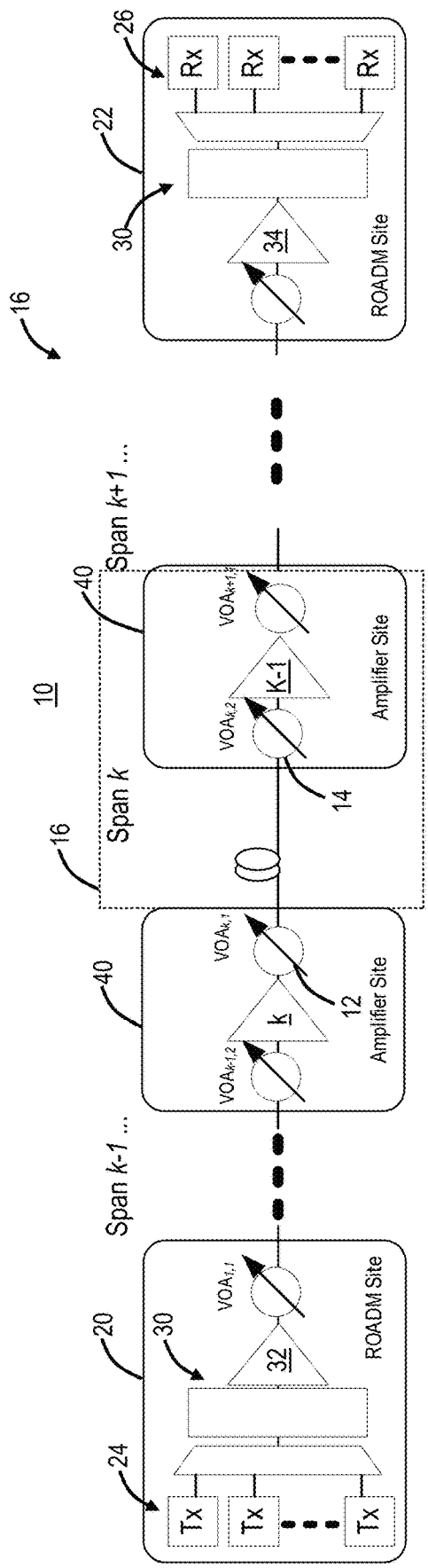
FIGS. 2A and 2B are network diagrams of an optical system with system configurations for per-span NLI measurements, where FIG. 2A includes two VOAs on each span, and FIG. 2B includes a single VOA on each span.
Figure 2B:
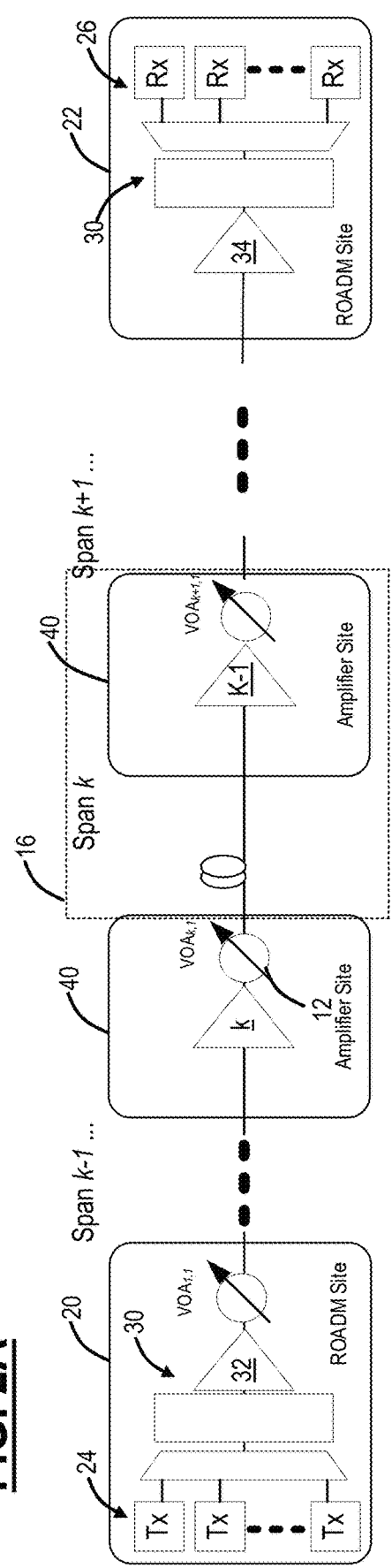

FIGS. 2A and 2B are network diagrams of an optical system 10 with system configurations for per-span NLI measurements, where FIG. 2A includes two VOAs 12, 14 on each span 16, and FIG. 2B includes a single VOA 12 on each span. The optical system 10 includes two reconfigurable optical add/drop multiplexer (ROADM) nodes 20, 22 which include optical modems (Tx 24, Rx 26). Note, for illustration purposes, the optical system 10 is illustrated in a single direction (from the Tx 24 to the Rx 26). Those skilled in the art will appreciate practical embodiments include bidirectional communication and the Tx 24 and Rx 26 can be integrated into an optical modem, transceiver, etc. The ROADM nodes 20, 22 can include multiplexing/demultiplexing components 30, a pre-amplifier 32, and a post amplifier 34. The optical system 10 includes various spans 16 where a number of spans 16 is equal to the number of amplifier nodes 40 plus one. The spans 16 are from the ROADM node 20 to the first amplifier node 40, between each pair of amplifier nodes 40, and the last amplifier node 40 to the ROADM 22. The amplifier node 40 includes an amplifier k, k−1 (where the amplifier k precedes the amplifier k-1). The difference between FIGS. 2A and 2B are that each amplifier node 40 in FIG. 2A includes VOAs 12, 14 at the input and output of the amplifier k, k−1 while the amplifier node 40 in FIG. 2B only includes the VOA 12 at the output of the amplifier k, k−1.

With the two measurement processes in sections 1(a) and 1(b), we propose three system applications for NLI measurement and system performance optimization described as follows in sections 2(a)-2(c).

§ 2(a) Characterize Nonlinear Noise of Existing Channels Per-Span and End-To-End In both cases in FIGS. 2A-2B, live traffic can be carried on the optical system 10 during the measurement. In FIG. 2A with VOAs before and after of the transmission fiber in each span, accurate per-span measurement of $P_{NL,k,j}$ and $NSR_{NL,k,j}$ (where k is span index, and j is channel index) can be realized by combining measurement processes described in section 1(a) and 1(c), where the measurement is done by shallow dithering the pair of VOAs at each span by a small amount for N times in opposite direction. In a system with an VOA only at the transmit side of the transmission fiber (as shown in FIG. 2B), accurate per-span measurement of $P_{NL,k,j}$ and $NSR_{NL,k,j}$ (where k is span index, and j is channel index) can be realized by combining measurement processes described in section 1(b) and 1(c), where the measurement is done by shallow dithering the VOA at the transmit side of the fiber under test (i.e. $VOA_{k,1}$) and the VOA at the transmit side the next span (i.e. $VOA_{k+1,1}$) by a small amount for N times in opposite direction.

In both cases the total link nonlinear NSR of each channel can be calculated by $$NSR_{NLI,tot,j} = \sum_{k} NSR_{NLI,k,j} \qquad (12)$$

§ 2(b) Achieving Optimal Launch Power Per Span with Existing Channel Loading One of the most important applications with per span NLI measurement is to find the optimal launch power per span where the span incremental SNR is maximized, or equivalently the span incremental NSR is minimized. As shown in both configurations in the optical system 10, the span to be optimized is defined between the two VOA's at the input sides of two adjacent transmission fibers (i.e., between $VOA_{k,1}$ and $VOA_{k+1,1}$).

The transmission performance of each span is characterized by Incremental NSR, $$NSR_{k,j} = NSR_{ASE,k,j} + NSR_{NLI,k,j} \qquad (13)$$

where $NSR_{k,j}$ represents the incremental NSR of channel j at span k. The best transmission performance of span k is achieved when $$\frac{d\sum_{j} NSR_{k,j}}{dP_k} = 0 \qquad (14)$$

Where $P_k$ is the span launch power to be optimized. In Eq. (14), $NSR_{k,j}$ is computed by Eq.13, where $NSR_{NLI,k,j}$ is from the measurement based on section 2(a) and the derivatives of $NSR_{NLI,k,j}$ are easily obtained with a finite difference method using the two states of NSR from dithering presented in the same section. The derivatives of $NSR_{ASE,k,j}$ can be calculated by linear noise modeling [See PCT Patent Application No. PCT/US2021/40087, previously referenced]. Therefore, optimal launch power at span k, can be obtained by solving Eq. (14).

§ 2(c) Characterization of Fiber Nonlinear Parameters Per Span

With accurate measurement of $NSR_{NLI,k}$, nonlinear parameters of the fibers in each span can be backed out for further modeling of the transmission performance as well as viability check before adding new channels or other state changes of interest in the network. Eq. (15) shows how $NSR_{NLI,k}$ is modeled with the fiber nonlinear parameters, i.e., fiber nonlinear coefficient γ and propagation coefficient $\beta_2$ $$NSR_{NLI,k} = \frac{16}{27}\gamma^2 P_0^2 g(v, \beta_2) \quad (15)$$

where v is frequency, g(•) is the normalized power spectral density of nonlinear noise which can be obtained by different methods, for example using the Gaussian noise (GN) model. In order to back out the fiber nonlinear parameters γ and $\beta_2$ based on a single equation, we need two different sets of g(•) to avoid degenerate solutions of γ and $\beta_2$. Therefore, the characterization requires a change of spectral shape, i.e., change of channel loading. This can be achieved by turn on/off a non-traffic carrying channel, or moving an existing non-traffic carrying channel to a different frequency. The non-traffic carrying channel could be an ASE channel holder or probe channel.

Figure 3:
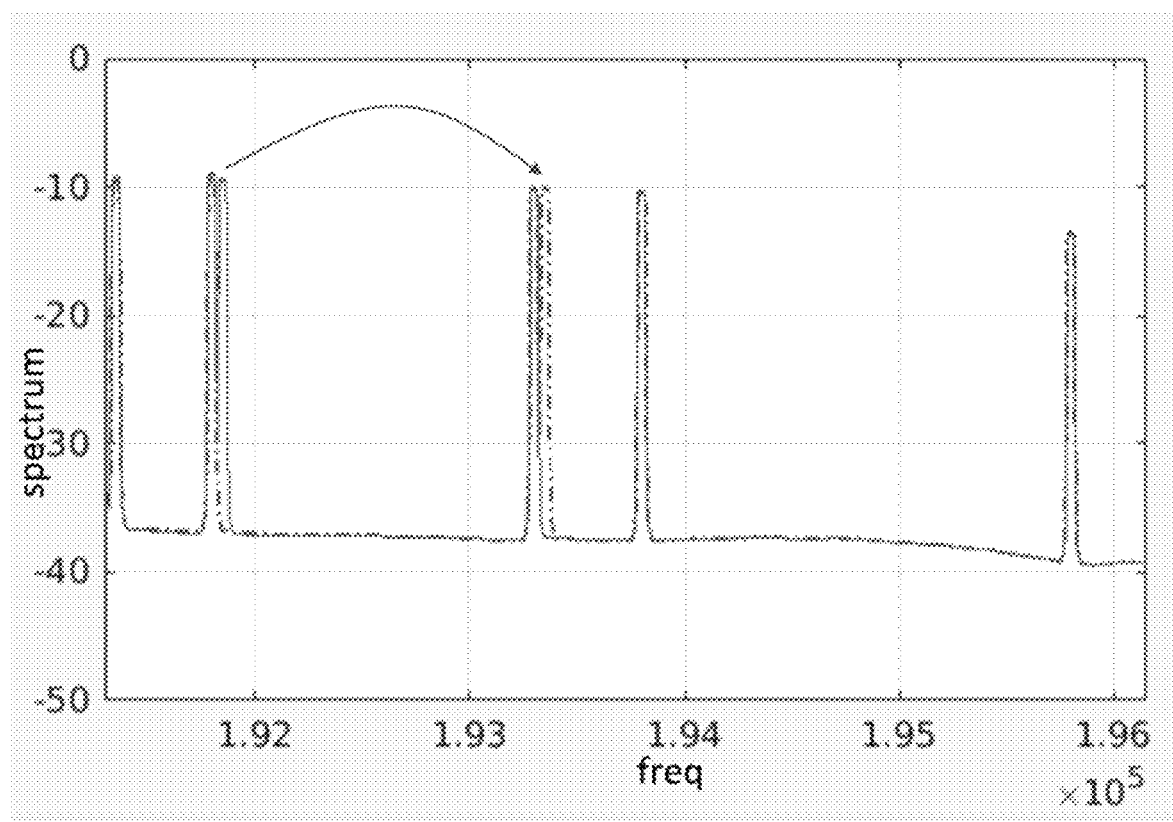
FIG. 3 is a graph of two sets of spectra used for span fiber nonlinear parameter characterization.

The characterization method is described using an example performed by simulation, where the fiber nonlinear parameters are measured at span 2 of a 3-span system. The fiber in span 2 is an 80 km non-dispersion shifted fiber (NDSF) fiber with fiber nonlinear parameters of γ=1.2e-3 [/mW/km], $\beta_2$@1568 nm=−22.2 [ps²/rad/km] (D@1568 nm=17 [ps/nm/km]), Dispersion slope=0.08 [ps/nm²/km]. As shown in FIG. 3, there are 6 channels going across the 3-span system. In order to create two sets of spectra/channel loading conditions, the channel at 191850 GHz, (assuming is a non-traffic carrying channel which could be a coherent probe, or an ASE channel, for example) is moved to 193350 GHz.

In the simulation, $NSR_{NLI,k,j}$ are measured at the optical receiver based on method described in 2(a)-Characterize nonlinear noise of existing channels per span and end to end. The results are listed in the following table:

|  | Ch freq (GHz) | | | | | | |
|---|---|---|---|---|---|---|---|
|  | 191350 | 191800 | 191850 | 193300 | 193350 | 193800 | 195800 |
| $NSR_{NLI,k}$ with spectrum#1 | −31.70 | −30.35 | −30.35 | −32.05 | N/A | −32.22 | −34.94 |
| $NSR_{NLI,k}$ with spectrum#2 | −31.45 | −31.22 | N/A | −30.72 | −30.68 | −32.05 | −34.81 |

Figure 4:
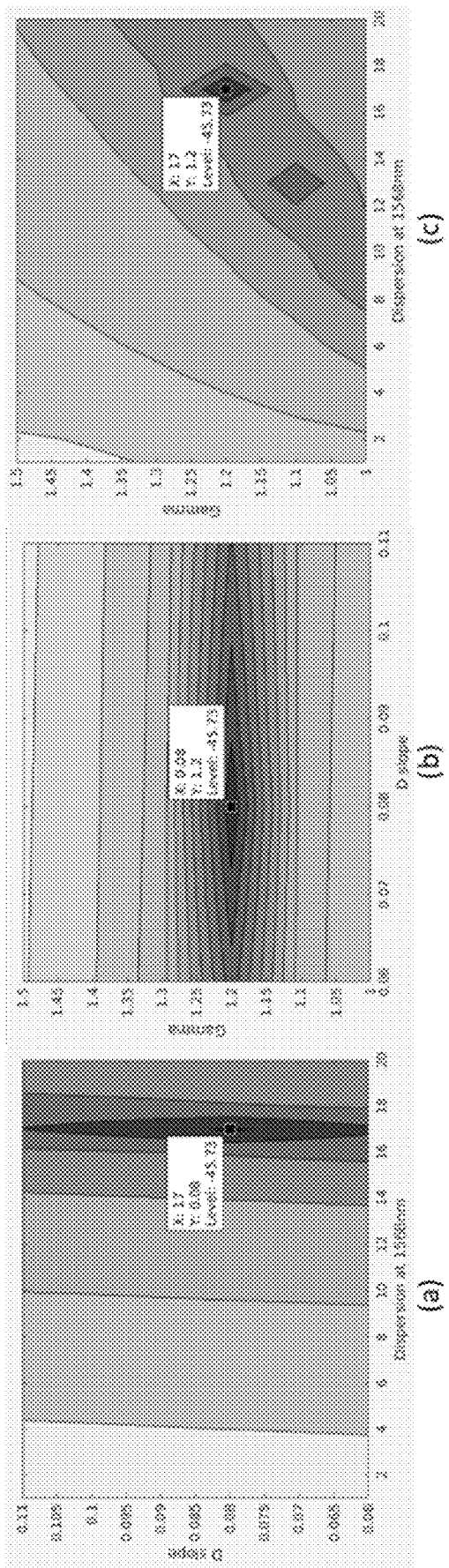
FIG. 4 is graphs of mean square error between modeled $\widetilde{NSR_{NLI,k}}$ and measured $NSR_{NLI,k}$ with different sets of fiber nonlinear parameters.

Then, minimum mean square error estimator (MMSE) is used to search for the set of fiber nonlinear parameters in modeling of the NLI, that minimize the error between the modeled $\widetilde{NSR}_{NLI,k}$ and measured $NSR_{NLI,k}$ (as in the above table). FIG. 4 shows the results of mean square error when searching for $D_{slope}$, γ and D@1568 nm. As shown in the figures, minimum mean square error is found when γ=1.2, D@1568 nm=17 and $D_{slope}$=0.08—The fiber nonlinear parameters are perfectly backed out.

§ 3 Process for Measuring Nonlinear Interference (NLI) on a Per-Span Basis

FIG. 5 is a flowchart of a process 100 for measuring nonlinear interference (NLI) on a per-span basis in an optical system with a plurality of spans. In various embodiments, the process 100 can be realized as a method having steps, a system including at least one processor and memory with instructions that, when executed, cause the at least one processor to implement the steps, and a non-transitory computer-readable medium having instructions stored thereon for programming at least one processor to perform the steps.

The process 100 includes varying power with a small amplitude on a span under test of the plurality of spans (step 102); observing total noise, at an optical receiver, from all of the plurality of spans (step 104); and isolating noise for the span under test from the total noise based on the varying power (step 106). Variously, the steps 102-106 can be as described in sections 1(a)-1(c). The optical system can be in-service with one or more traffic-carrying channels, and wherein the varying power on the span under test does not impact the one or more traffic-carrying channels, as described in section 1(c).

The varying power can be performed based on modifying settings on variable optical attenuators (VOAs) on each end of the span under test, as described in section 1(a). The varying power can be performed based on modifying settings on a single variable optical attenuator (VOAs) on the span under test, as described in section 1(b). The varying power and the observing total noise can be performed multiple times with the isolating noise including averaging based on the multiple times, as described in section 1(c). The varying power and the observing total noise can include phase sensitive detection where a power perturbation is dithered and the observing total noise is estimated for each oscillation of the power perturbation, as described in section 1(c). The amplitude of the power perturbation is small enough to have negligible impact to the total SNR performance of the in-service channels.

The process 100 can further include performing the isolating noise for all of the plurality of spans, such that NLI is characterized for all spans of the optical system; and characterizing noise for existing channels on the optical system on a per-span basis, as described in section 2(a). The process 100 can further include performing the isolating noise for all of the plurality of spans, such that NLI is characterized for all spans of the optical system; and determining launch power per span with channel loading, as described in section 2(b). The process 100 can further include performing the isolating noise for all of the plurality of spans, such that NLI is characterized for all spans of the optical system; and characterizing fiber nonlinear parameters per span, as described in section 2(c). The noise can be a noise-to-signal ratio (NSR).

§ 4 Direct Optimization of Span Launch Power and VOA Targets

Referring back to FIGS. 2A and 2B, the present disclosure includes an approach for optimizing the span launch power of one or more spans in the optical system. Specifically, this includes optimizing the span launch power of each span and removing the coupling between spans that normally makes it difficult to build power control loops at the network level.

Figure 6A:
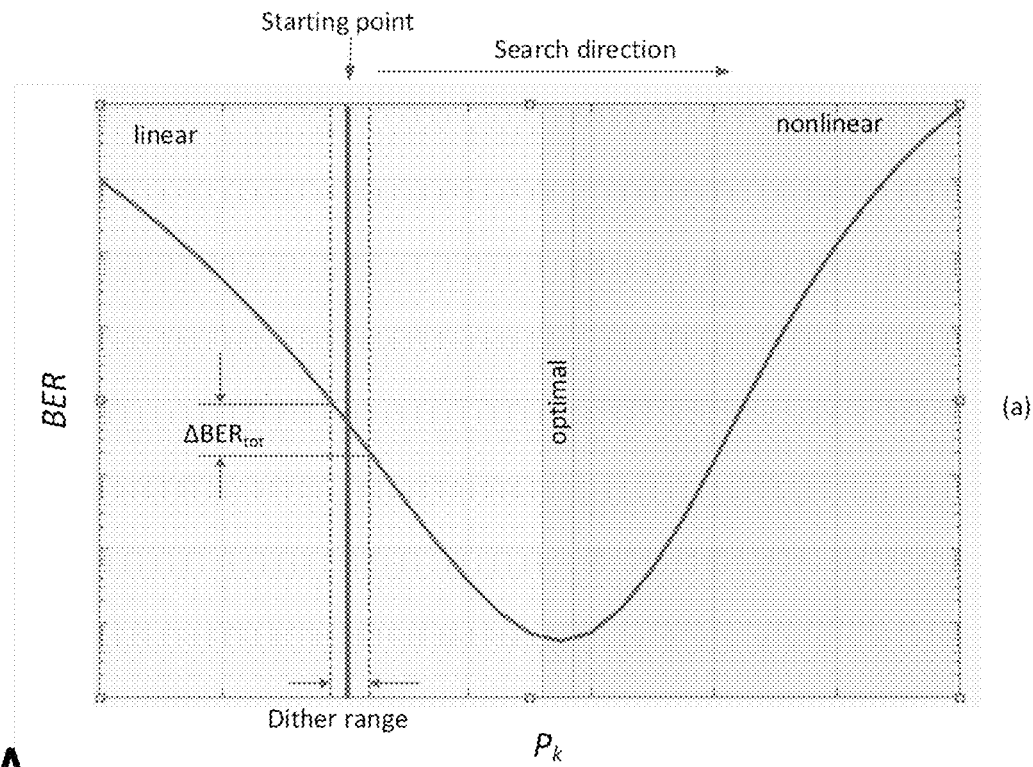
FIGS. 6A and 6B are graphs of BER versus launch power, using the approach described in FIG. 7 for multiple span systems.
Figure 6B:
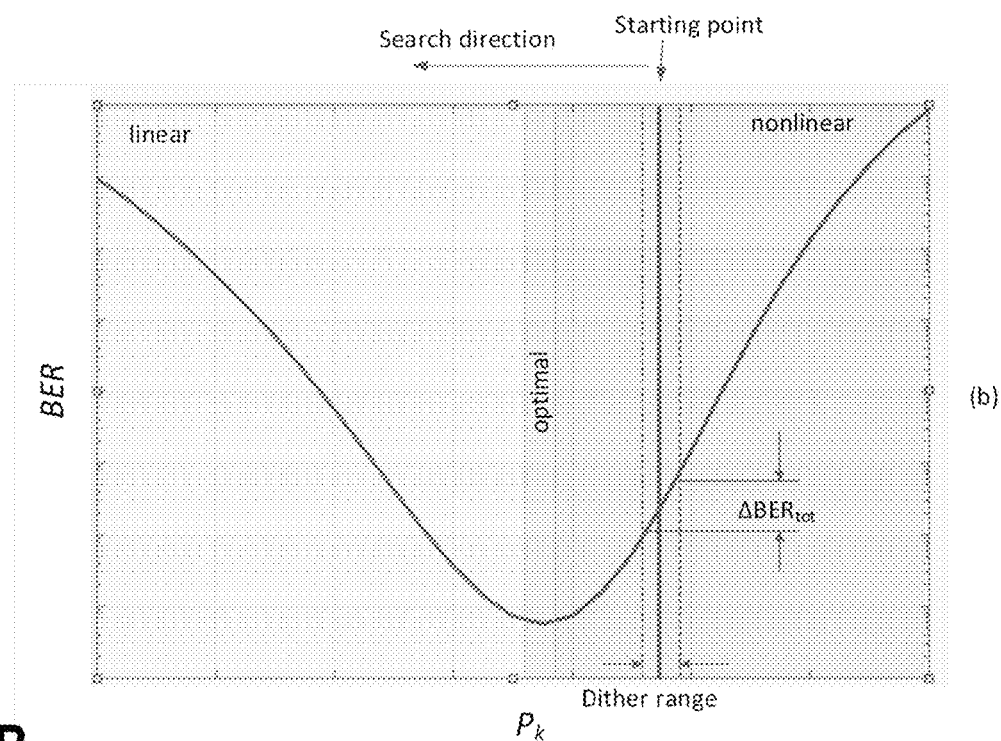

If the optical system 10 include a single span, the span launch power can be adjusted while monitoring the pre-forward error correction (FEC) BER for a channel that traverses the span. The BER will decrease with increasing power until an optimum is reached beyond which the BER will increase again. FIGS. 6A and 6B are graphs of BER versus launch power, using the approach described herein. Of note, the general shape of the graph illustrates the fact BER decreases to an optimum point and then increases, as launch power is increased.

Again, for a single span, a gain control loop can be constructed by applying a small dither to the span launch power and observing the variation in BER that is synchronous with the dither using a form of phase sensitive detection. If the BER is in phase with the dither, it indicates that increasing the launch power makes the BER worse. If it is out of phase, it indicates that increasing the gain it in makes the BER better. The magnitude and phase of the BER in response to the dither provides a signed error signal that can be used as part of a feedback loop, such as a proportional integral derivative (PID) controller, to maintain a span launch power which minimizes the BER.

This technique will not work for multi-span links, such as illustrated in the optical system 10 in FIGS. 2A and 2B, because the noise performance of the downstream link depends on the launch power that was chosen for the given span. The spans are coupled, and this coupling makes it difficult to build control loops that find the optimal launch power for each span that optimizes the BER at the receiver.

Again, in FIGS. 2A and 2B, the amplifiers k, k−1 include VOAs 12, 14, such as the VOA 12 after the gain stage. The control of span launch power can be realized by varying this VOA 12. The combination of the VOA 12 at the input of a given span and the gain of the following Amp preceding the following span (or loss of one of the downstream VOAs 12 at the input of the next span) can be used to dither the power in the given span and to compensate for that change in power such that the power entering subsequent spans remains constant. In doing so, the gain control approach previously described for single span links can be used to optimize the gain for each span in a multi-span link.

Figure 7A:
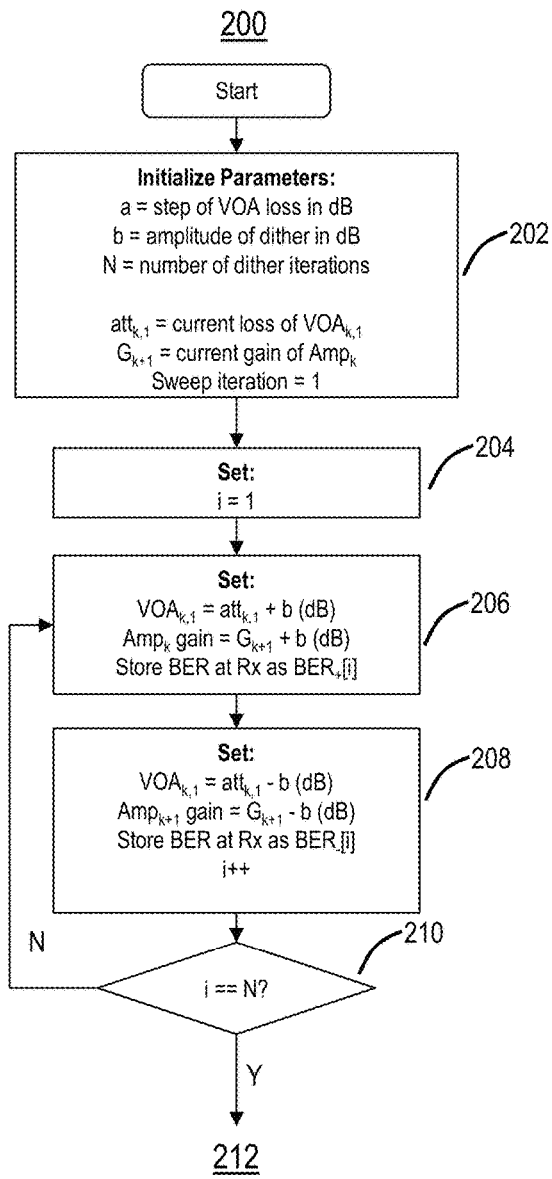
FIGS. 7A and 7B is a flowchart of an optimal launch power search with shallowing dithering.
Figure 7B:
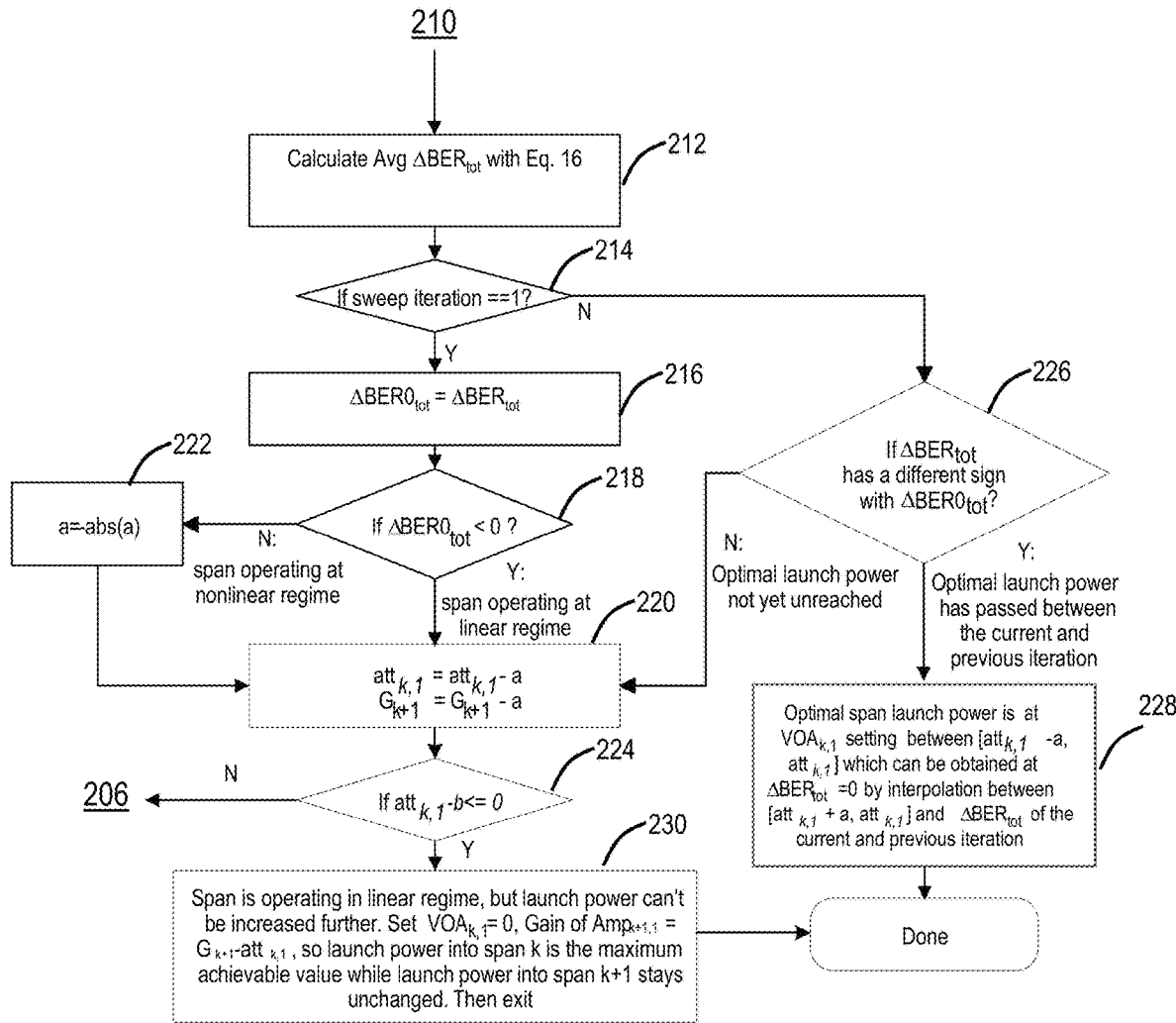

FIGS. 7A, 7B are a flowchart of an optimal launch power search 200 using shallow dithering. The objective is to find the optimal per-span launch power, where a span is defined as the fiber+amplifier combo (i.e., the spans k−1, k, k+1 in the optical system 10). The VOA 12 before the fiber+amplifier combo is shallow dithered with the same dB-magnitude, but in the opposite direction to the gain of the downstream amplifier k,32 (i.e. if we are adjusting loss of VOA, we adjust gain of amp in same direction so the losses/gains cancel) to keep the power to the downstream fiber constant while maintaining the maximum total output power at each amplifier 32,42 to provide the best possible noise figure for a given launch power condition. When we change the loss of our VOA preceding the fiber, we would need to change the gain of the downstream amp to ensure it continues hitting max TOP (since the best NF occurs at the highest possible gain, and in our initialization step we set EDFAs to hit max TOP). Since max TOP is achieved on every amp; that means that adjusting the launch power higher on a given span would need a reduction in the gain (because we cannot exceed the EDFA max TOP), and reducing the launch power would also make us want to increase the downstream amp to again achieve max TOP.

First the amplifiers 32,k would be adjusted to have their gain increased to achieve their maximum total output power (TOP), and their VOA 12 to achieve maintain the same launch power, and if necessary the VOAs 12 would be set to ensure the launch power targets before this optimization runs are maintained (step 200). All of this is done while respecting a minimum of b dB headroom on the VOA and amp gain to ensure the first set of measurements can be taken. After initializing the measurement parameters (steps 202, 204), measurement starts with shallow dithering the VOA at fiber input and the downstream amplifier gain N times around the current target settings by +/−b (dB) where b should be a small number, where both b and N can be defined by the user or the measurement program in the parameter initialization step 202 (steps 206, 208, 210). Note that b can also be dynamically changed during the measurement to speed up the search. Both $VOA_{k,1}$ and $Amp_{k+1}$ would be dithered at the same time, where one is increasing in gain and the other is increasing in loss but alternating direction, to isolate the power and gain-dependent noise contributions from the span-amp combo under test. After finishing the dithering measurement around the current VOA settings, $\Delta BER$ is computed (step 212) as:

$$\Delta BER = \sum_{i=1}^{N}(BER_+ - BER_-)/N \tag{16}$$

Where $BER_+$ is the BER where $VOA_{k,1}$ transmission increases by b and $VOA_{k+1,1}$ decreases by b and $BER_-$ is the BER when the sign of the dither on the two VOAs is reversed. N is the number of cycles included in the average. After the first iteration (step 214), $\Delta BER0_{tot}$ is set to $\Delta BER_{tot}$ (step 216).

If $\Delta BER<0$ (step 218), i.e., higher launch power gives better performance as shown in FIG. 6A, it means the span is currently operating in the linear regime. Consequently, the search of optimal launch power should go toward higher power with lower VOAk,1 value (step 220). For the next iteration, VOAk,1 is decreased by a dB, where a is a small positive number. Note that a can also be dynamically changed during the measurement. If $\Delta BER>0$ (step 218), i.e., lower launch power gives better performance as shown in FIG. 6B, it means the span is currently operating in the nonlinear regime, such that VOAk,1 needs to be increased (step 222, 220) to search for the optimal launch power at lower value. For both cases, the gain of $Amp_{k+1}$ is changed in the same direction as the loss of VOAk,1 (i.e. one increases in gain, and the other increases in loss) to keep the power to the next span constant.

After updating the VOA settings, we first check if the VOA has hit 0 dB (step 224) in which case we cannot optimize further and must exit (step 230), i.e., if we are in the linear regime, but we run out of dynamic range to increase the power into the span), otherwise the next iteration of measurement starts (step 206). In the new iteration, when $\Delta BER$ is obtained, it is compared with $\Delta BER$ in the first iteration (step 226). If the sign of $\Delta BER$ stays unchanged, the span operation regime is unchanged and optimal launch power is not reached, go to step 220. So, the next sweep iteration of the optimization will change the VOA toward the same direction as the previous step. If the sign of $\Delta BER$ is changed from $\Delta BER0$, it means the span operation regime has changed between the VOA settings of the current and previous iteration. Therefore, optimal launch power can be found at ΔBER=0 by interpolation between launch powers and ΔBER of the current and previous iteration (step 228).

§ 5 Process for Optimizing Span Launch Power

FIG. 8 is a flowchart of a process 300 for optimizing launch power for each span in an optical system with a plurality of spans. In various embodiments, the process 300 can be realized as a method having steps, a system including at least one processor and memory with instructions that, when executed, cause the at least one processor to implement the steps, and a non-transitory computer-readable medium having instructions stored thereon for programming at least one processor to perform the steps.

The process 300 includes varying power on a span under test of the plurality of spans (step 302); observing performance measurements (e.g. BER, NSR, SNR, error vector magnitude, etc.) related to one or more channels, at corresponding optical receivers (step 304); and one of setting launch power for the span under test and repeating the varying and observing, responsive to the observed measurements (step 306). The varying power can be performed based on modifying settings of variable optical attenuator (VOA) at the input to the span under test and the gain of the downstream amplifier after at the output of the span under test. The varying can include dithering the power based on variable optical attenuator (VOA) settings and/or amplifier gain settings.

The observed measurements can be used as an error signal in the repeating to obtain a substantially minimized observed measurements. The repeating can include an adjustment of the varying power based on whether the span under test is in a linear regime or nonlinear regime. The setting launch power can be determined when a sign of a change in the observed measurements between iterations has changed. The varying power and the observing the measurements can be performed multiple times including averaging based on the multiple times. The varying power can be performed in the span under test and compensated in a subsequent span. The process 300 can further include performing the varying and the observing on different spans simultaneously by performing the varying with different dither frequencies on the different spans and detecting performance measurements at each of the different dither frequencies.

In an embodiment, the observed measurements can be bit error rate (BER). Those skilled in the art will recognize the observed measurements used for feedback in our optimization could be one of several sources (e.g., signal to noise ratio (SNR), noise to signal ratio (NSR), BER, EVM, etc.)

§ 6 Conclusion

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method of optimizing launch power for each span in an optical system with a plurality of spans, the method comprising steps of:
varying power on a span under test of the plurality of spans;
observing measurements related to one or more channels, at corresponding optical receivers; and
one of (i) setting launch power for the span under test and (ii) repeating the varying power step and the observing measurements step, responsive to the measurements wherein the measurements are used as an error signal in the repeating step to obtain a substantially minimized error signal.

2. The method of claim 1, wherein the varying power step is performed based on modifying settings of variable optical attenuators (VOAs).

3. The method of claim 1, wherein the varying power step is performed based on modifying settings associated with any of a launch power and amplifier gain.

4. The method of claim 1, wherein the varying power step includes dithering the power based on variable optical attenuator (VOA) settings or a combination of VOA settings and amplifier gain settings.

5. The method of claim 1, wherein the repeating step includes an adjustment in the varying power step based on whether the span under test is in a linear regime or nonlinear regime.

6. The method of claim 1, wherein the launch power is determined when a sign of a change in the measurements between iterations has changed.

7. The method of claim 1, wherein the varying power step and the observing measurements step are performed multiple times including averaging based on the multiple times.

8. The method of claim 1, wherein the varying power step is performed in the span under test and comppensation is applied in a subsequent span.

9. A non-transitory computer-readable medium having instructions stored thereon for programming at least one processor for optimizing launch power for each span in an optical system with a plurality of spans, wherein the instructions, when executed, cause the at least one processor to perform steps of:
varying power on a span under test of the plurality of spans;
observing measurements related to one or more channels, at corresponding optical receivers; and
one of (i) setting launch power for the span under test and (ii) repeating the varying power step and the observing measurements step, responsive to the measurements, wherein the measurements are used as an error signal in the repeating step to obtain a substantially minimized error signal.

10. The non-transitory computer-readable medium of claim 9, wherein the varying power step is performed based on modifying settings of variable optical attenuators (VOAs).

11. The non-transitory computer-readable medium of claim 9, wherein the varying power step is performed based on modifying settings associated with any of a launch power and amplifier gain.

12. The non-transitory computer-readable medium of claim 9, wherein the varying power step includes dithering the power based on variable optical attenuator (VOA) settings.

13. The non-transitory computer-readable medium of claim 9, wherein the repeating step includes an adjustment in the varying power step based on whether the span under test is in a linear regime or nonlinear regime.

14. The non-transitory computer-readable medium of claim 9, wherein the launch power is determined when a sign of a change in the measurements between iterations has changed.

15. The non-transitory computer-readable medium of claim 9, wherein the varying power step and the observing measurements step are performed multiple times including averaging based on the multiple times.

16. The non-transitory computer-readable medium of claim 9, wherein the varying power step is performed in the span under test and compensation is applied in a subsequent span.

17. A non-transitory computer-readable medium having instructions stored thereon for programming at least one processor for optimizing launch power for each span in an optical system with a plurality of spans, wherein the instructions, when executed, cause the at least one processor to perform steps of:
varying power on a span under test of the plurality of spans which is performed based on modifying settings of variable optical attenuators (VOAs);
observing measurements related to one or more channels, at corresponding optical receivers; and
one of (i) setting launch power for the span under test and (ii) repeating the varying power step and the observing measurements step, responsive to the measurements, wherein the measurements are used as an error signal in the repeating step to obtain a substantially minimized error signal.

18. The non-transitory computer-readable medium of claim 17, wherein the varying power step is also performed based on modifying settings associated with any of a launch power and amplifier gain.

19. The non-transitory computer-readable medium of claim 17, wherein the repeating step includes an adjustment in the varying power step based on whether the span under test is in a linear regime or nonlinear regime.

20. The non-transitory computer-readable medium of claim 17, wherein the launch power is determined when a sign of a change in the measurements between iterations has changed.

* * * * *